United States Patent
Hatlen et al.

(10) Patent No.: US 9,885,615 B2
(45) Date of Patent: Feb. 6, 2018

(54) MOVABLE CONTACT SENSOR ASSEMBLY HAVING SEALED CONSTRUCTION

(71) Applicant: Watlow Electric Manufacturing Company, St. Louis, MO (US)

(72) Inventors: Rick Hatlen, Richmond, IL (US); Art Volbrecht, Richmond, IL (US); Ryan Affara, Richmond, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 492 days.

(21) Appl. No.: 14/588,472

(22) Filed: Jan. 2, 2015

(65) Prior Publication Data

US 2015/0185084 A1   Jul. 2, 2015

Related U.S. Application Data

(60) Provisional application No. 61/923,200, filed on Jan. 2, 2014.

(51) Int. Cl.
  *G01K 1/08*  (2006.01)
  *G01K 1/14*  (2006.01)

(52) U.S. Cl.
  CPC .............. *G01K 1/08* (2013.01); *G01K 1/143* (2013.01)

(58) Field of Classification Search
  CPC  G01K 1/08; G01K 1/14; G01K 1/143; G01K 1/146
  See application file for complete search history.

(56) References Cited

U.S. PATENT DOCUMENTS

| | | | |
|---|---|---|---|
| 3,516,873 A | | 3/1970 | Bonkowski et al. |
| 3,547,707 A | * | 12/1970 | Bragg ............... G01K 1/024 136/224 |
| 3,777,696 A | | 12/1973 | Bilbrey |
| 3,845,661 A | * | 11/1974 | Hollweck ......... G01K 1/146 138/90 |
| 4,598,581 A | * | 7/1986 | Brekke ............. G01K 1/146 374/145 |
| 4,602,767 A | * | 7/1986 | Spiegelman ..... C21D 9/0068 266/249 |
| 4,980,675 A | * | 12/1990 | Meisenheimer, Jr. . H01H 35/28 200/83 C |

(Continued)

FOREIGN PATENT DOCUMENTS

| | | |
|---|---|---|
| DE | 10 2005 04069 | 1/2007 |
| EP | 0 206 451 | 12/1986 |

OTHER PUBLICATIONS

International Search Report and Written Opinion for PCT/US2015/010012 dated Mar. 13, 2015.

*Primary Examiner* — Lisa Caputo
*Assistant Examiner* — Philip Cotey
(74) *Attorney, Agent, or Firm* — Burris Law, PLLC

(57) ABSTRACT

A sensor assembly includes a tubular housing having an inner surface defining an axial chamber and a temperature sensor disposed in the axial chamber and moveable along an axial direction of the tubular housing. The sensor assembly further includes a seal carrier movable with the temperature sensor, and a sealing member disposed around the seal carrier. The sealing member is in sliding contact with the inner surface of the tubular housing and hermetically seals an interface between the sealing member and the inner surface of the tubular housing.

18 Claims, 3 Drawing Sheets

(56) References Cited

U.S. PATENT DOCUMENTS

| | | | | |
|---|---|---|---|---|
| 7,465,086 B1* | 12/2008 | Foreman, Jr. | ............ | G01K 1/08 |
| | | | | 136/200 |
| 2007/0001451 A1* | 1/2007 | Struven | ................... | F16B 7/182 |
| | | | | 285/318 |
| 2008/0223139 A1* | 9/2008 | Hirose | ..................... | G01L 23/10 |
| | | | | 73/715 |
| 2010/0206708 A1* | 8/2010 | Priest | ................. | H01H 35/2614 |
| | | | | 200/81 R |
| 2013/0163637 A1* | 6/2013 | Parsons | ................... | G01K 1/14 |
| | | | | 374/179 |

\* cited by examiner

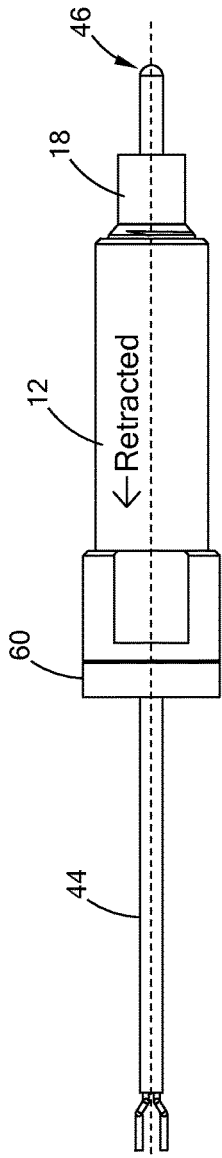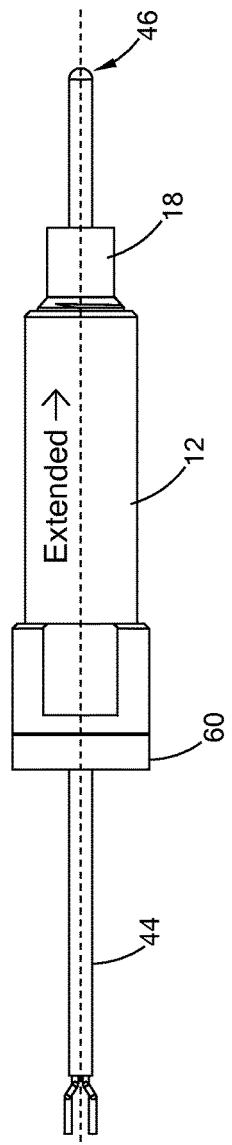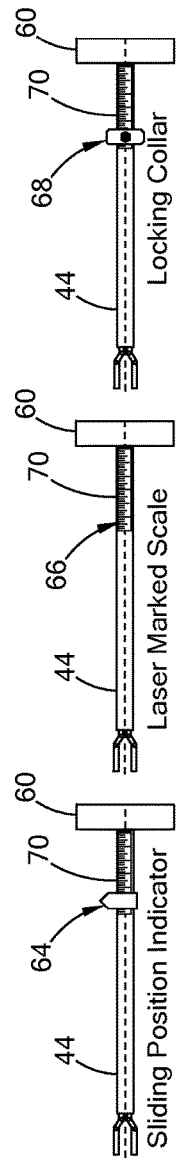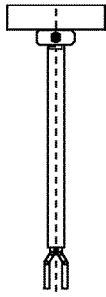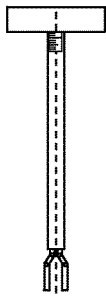

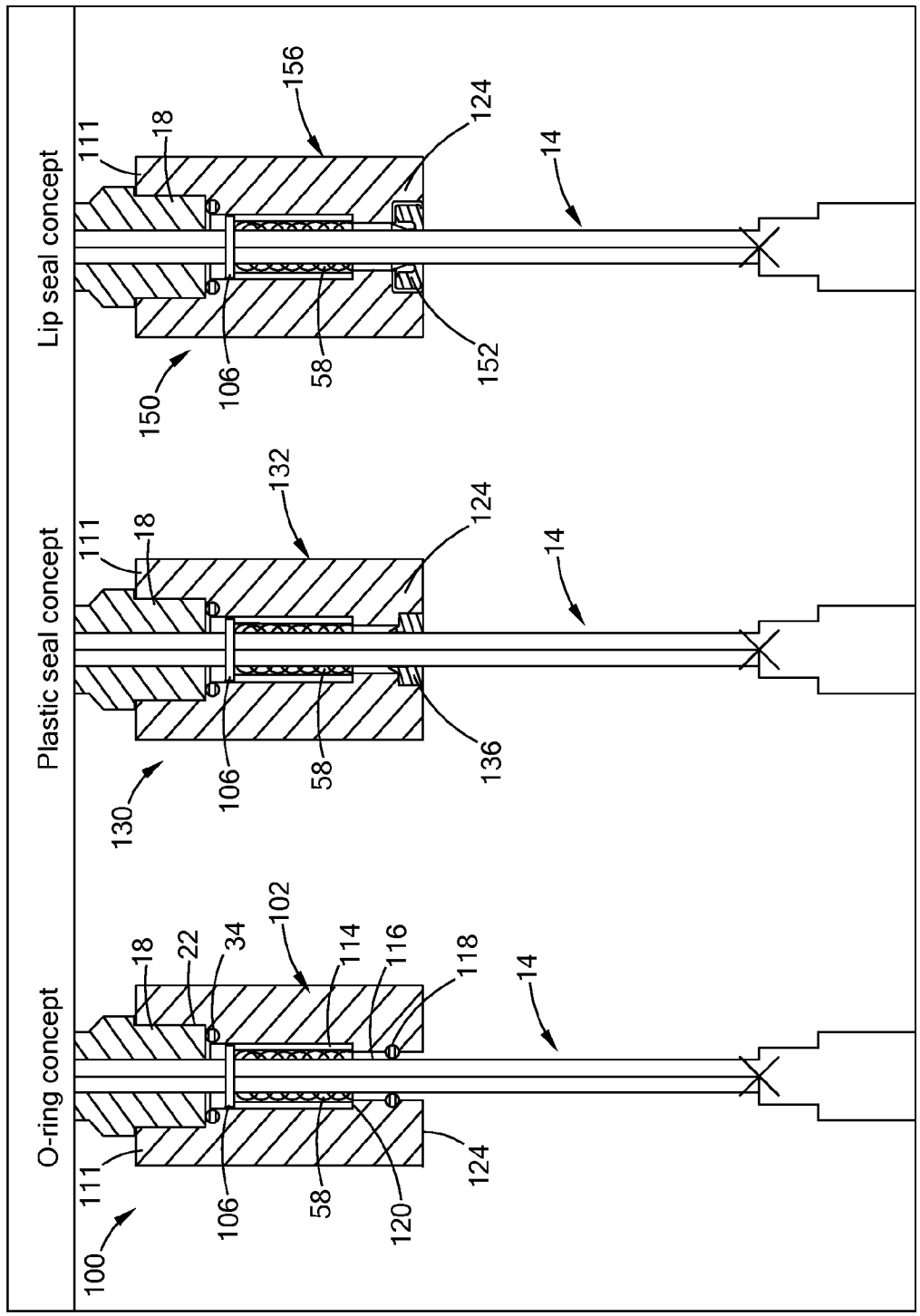

MOVABLE CONTACT SENSOR ASSEMBLY HAVING SEALED CONSTRUCTION

CROSS-REFERENCE TO RELATED APPLICATIONS

This application claims the benefit of provisional application Ser. No. 61/923,200 filed on Jan. 2, 2014, the contents of which are incorporated herein by reference in their entirety.

FIELD

The present application relates to temperature sensors, and more specifically to temperature sensor assemblies mounted to, for example, a processing chamber for measuring a temperature of an object in the processing chamber.

BACKGROUND

The statements in this section merely provide background information related to the present disclosure and may not constitute prior art.

A temperature sensor for measuring the temperature of an object in a processing chamber generally includes a mounting structure to fixedly secure the temperature sensor to a wall of the processing chamber. The processing chamber may contain processing gases, may be pressurized and/or may be in a vacuum environment. Generally, a sensor tip of the temperature sensor is inserted into a hole of the processing chamber to contact the object to be measured. A seal is also generally provided to hermetically seal the hole to prevent processing gases from leaking or to maintain a desired pressure or vacuum in the processing chamber.

The sensor tip of the temperature sensor, when inserted into the processing chamber, cannot be seen. It is difficult to determine whether the sensor tip contacts the object to be measured during installation or whether the sensor tip maintains sufficient contact with the object after an extended period of operation. An accurate temperature measurement cannot be achieved when the sensor tip is not in good contact with the object to be measured.

SUMMARY

In one form of the present disclosure, a sensor assembly includes a tubular housing, a temperature sensor, a seal carrier and a sealing member. The tubular housing has an inner surface defining an axial chamber. The temperature sensor is disposed in the axial chamber and is movable along an axial direction of the tubular housing. The seal carrier is movable with the temperature sensor. The sealing member is mounted to the seal carrier. The sealing member is in sliding contact with the inner surface of the tubular housing and hermetically seals an interface between the sealing member and the inner surface of the tubular housing.

In another form, a sensor assembly includes a tubular housing, a temperature sensor surrounded by the tubular housing and movable along an axial direction of the tubular housing, and a movable seal assembly in sliding contact with an inner surface of the tubular housing.

In still another form, a sensor assembly includes a tubular housing having a proximal end and a distal end, an elongated temperature sensor, and a seal. The elongated temperature sensor is movable within the tubular housing along an axial direction of the tubular housing. The elongated temperature sensor has a sensor tip protruding from the distal end of the tubular housing. The seal is secured to the proximal end of the tubular housing to hermetically seal an interface between the elongated temperature sensor and the tubular housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 2A and 2B are side views of a sensor assembly constructed according to the present disclosure, wherein the sensor assembly is shown to be in an extended state and a retracted state, respectively;

FIGS. 3A to 5B show various forms of a position indicator mounted to a sensor assembly constructed according to the present disclosure, wherein FIGS. 3A, 4A and 5A show the sensor assembly in an extended state whereas FIGS. 3B, 4B and 5B show the sensor assembly in a retracted state;

FIG. 6 is a schematic view of a sensor assembly constructed according to a second embodiment of the present disclosure;

FIG. 7 is a schematic view of a sensor assembly according to a third embodiment of the present disclosure; and FIG. 8 is a schematic view of a sensor assembly according to a fourth embodiment of the present disclosure.

DETAILED DESCRIPTION

Figure 1:
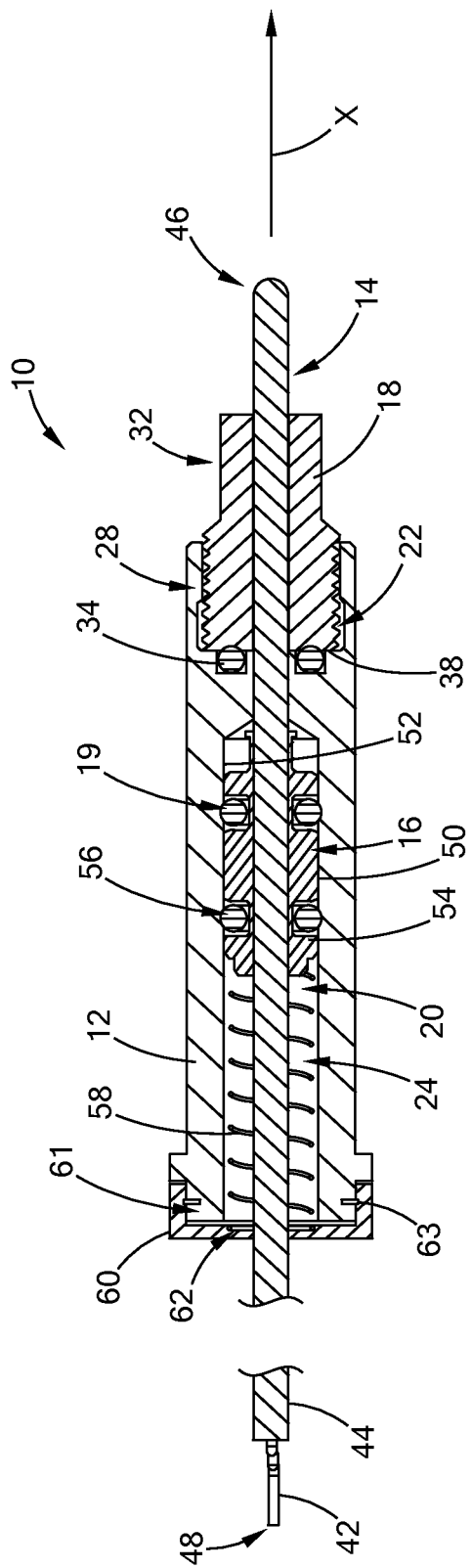
FIG. 1 is a cross-sectional view of a sensor assembly constructed according to a first embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a sensor assembly 10 according to a first embodiment of the present disclosure generally includes a tubular housing 12, a temperature sensor 14 extending through the tubular housing 12, a seal carrier 16 disposed inside the tubular housing 12, and a mounting member 18. The sensor assembly 10 is suitable for measuring a temperature of an object disposed in a processing chamber (not shown). The processing chamber may contain processing gases, may be pressurized, and/or may be in a vacuum environment. The mounting member 18 secures the sensor assembly 10 to a wall (not shown) of the processing chamber.

The tubular housing 12 has a generally cylindrical shape in one form and defines an axial chamber 20 having a first chamber portion 22 and a second chamber portion 24. The temperature sensor 14 has an elongated shape and extends through the first chamber portion 22 and the second chamber portion 24 and is movable relative to the tubular housing 12 in an axial direction X, as set forth in greater detail below.

The mounting member 18 has a proximal end 28 that in one form is threaded to the first chamber portion 22 and a distal end 32 that protrudes axially from the tubular housing 12. The protruding end 32 is secured, for example, by welding, to the wall of the processing chamber, thereby securing the sensor assembly 10 to the processing chamber, or measurement environment. A first seal 34, also referred to as an end seal, in the form of an O-ring, is provided in an annular groove formed in an end face 38 of the first chamber portion 22 and surrounding the temperature sensor 14. The first seal 34 seals an interface between the tubular housing 12 and the mounting member 18. Therefore, processing gases or pressurized gas from the processing chamber is prevented from entering the axial chamber 20 of the tubular housing 12 through a path along the threaded connection between mounting member 18 and the first chamber portion 22. The mounting member 18 can be secured to the tubular housing 12 in any conventional means depending on applications without being limited to the threaded connection shown in FIG. 1.

The temperature sensor 14 includes a sensing element 42 and an outer sheath 44 surrounding and protecting the sensing element 42. The temperature sensor 14 extends through and is freely movable within the tubular housing 12 and the mounting member 18 along the axial direction X. The temperature sensor 14 includes a distal end or sensor tip 46 inserted into the processing chamber and a proximal end 48 disposed outside the processing chamber and the tubular housing 12 to be connected to an external controller or power source (not shown). The temperature sensor 14 may be a thermocouple, a mineral insulated thermocouple, a resistance temperature detector (RTD), a thermistor, or a microcoil, among others. Any other type of temperature sensor or sensor for other operating information other than temperature (e.g., pressure, humidity, among others) can be used in the sensor assembly 10 without departing from the scope of the present disclosure.

The seal carrier 16 has a generally cylindrical shape for supporting and securing at least a second seal member 19 as shown. The seal carrier 16 is disposed in the second chamber portion 24 of the tubular housing 12 and surrounds the outer sheath 44 of the temperature sensor 14. The seal carrier 16 is secured and sealed to the temperature sensor 14 such that the seal carrier 16 is movable with the temperature sensor 14 and no air or fluid path is formed between the seal carrier 16 and the outer sheath 44 of the temperature sensor 14.

The seal carrier 16 has an outside diameter smaller than an inside diameter of the tubular housing 12 in the second chamber portion 24 and thus is freely slidable within the second chamber portion 24 of the tubular housing 12. The second seal member 19 may include a pair of O-rings 56 disposed in a pair of annular grooves 54 in a peripheral surface of the seal carrier 16. The seal carrier 16 and the second seal member 19 together form a movable seal movable with the temperature sensor 14. The movable seal allows the temperature sensor 14 to be inserted into or retracted from the processing chamber along the axial direction X during operation while maintaining a hermetic seal within the tubular housing 12. The second seal member 19 prevents processing or pressurized gas from traveling beyond the second seal member 19 even when the processing or pressurized gas enters the tubular housing 12 through a path along the outer sheath 44 of the temperature sensor 14. The second seal member 19 hermetically seals an interface between the movable seal and an inner surface 50 of the tubular housing 12 in the second chamber portion 24.

The number of the annular grooves 54 and O-rings 56 is not limited to two (2) and may be any number without departing from the scope of the present disclosure. It is also understood that the second seal member 19 is not limited to O-rings and can have other forms without departing from the scope of the present disclosure.

The sensor assembly 10 further includes a spring 58 installed over the outer sheath 32 and engages an end of the seal carrier 16. The spring 58 provides a biasing force against the seal carrier 16 and hence the temperature sensor 14. The spring 58 helps maintains contact between a sensor tip (i.e., the distal end) 46 of the temperature sensor 14 and an object to be measured in the processing chamber.

The sensor assembly 10 further includes an end cap 60 attached to a proximal end 61 of the tubular housing 12 to maintain the spring 58 in a compressed and biased state. The end cap 60 may be secured to the tubular housing 12 by an internal retainer ring 63. The end cap 60 may include a seat 62 in the form of a recess to properly position the spring 58 in the second chamber portion 24. The temperature sensor 14 can be moved axially by the spring 58. To adjust the spring force, a spacer (not shown) may be optionally provided between the spring 58 and the seal carrier 16 or between the end cap 60 and the spring 58. Alternatively, a different spring having a different spring constant may replace the spring 58 to suit a particular application. The temperature sensor 14 is free to retract into the tubular housing 12 when an external force is applied to the sensor tip 46 of the temperature sensor 14 by the object to be measured in the processing chamber.

Referring to FIGS. 2A and 2B, the temperature sensor 14 of the temperature sensor assembly 10 is shown to be retracted into the tubular housing 12 (FIG. 2A) or extended further into a processing chamber (FIG. 2B). The temperature sensor 14 in the extended state protrudes into the processing. When the sensor tip 46 is in contact with the object to be measured, the object applies a force against the sensor tip 46 and thus the temperature sensor 14 is retracted into the tubular housing 12. The spring 58 in the tubular housing 12 is thus compressed and biased. The biasing force of the spring 58 helps maintain the sensor tip 46 in good contact with the object to be measured.

Referring to FIGS. 3A to 5B, the sensor assembly 10 may include a position indicator 64, 66 or 68 disposed on the outer sheath 44 of the temperature sensor 14 to indicate the depth of the temperature sensor 14 into the processing chamber. The position indicator 64, 66 or 68 is disposed adjacent to the end cap 60 and outside the tubular housing 12. The position indicator 64, 66, 68 may be in the form of a sliding position indicator 64 (FIGS. 2A and 2B), a laser marked scale 66 (FIGS. 3A and 3B), or a locking collar indicator 68 (FIGS. 4A and 4B). FIGS. 3A, 4A and 5A show the temperature sensor 14 is in an extended position when the sensor tip 46 does not contact any object and the spring is in an initial state, whether released or slightly biased. FIGS. 3B, 4B and 5B show the temperature sensor 14 is in a retracted position when the sensor tip 46 contacts the object to be measured and the spring 58 is further biased by the object to be measured. When the sensor tip 46 is in contact with the object to be measured, the temperature sensor 14 is retracted into the tubular housing 12 and a part 70 of the temperature sensor 14, which is initially located within the tubular housing 12, is moved outside the tubular housing 12. A change in depth could indicate a change in the status of the process.

Referring to FIG. 6, a sensor assembly 100 constructed according to a second embodiment of the present disclosure does not have a movable seal that moves with the temperature sensor 14. Instead, a fixed second seal member is provided at a proximal end 124 of the tubular housing 102 in the present embodiment. More specifically, the sensor assembly 100 includes a tubular housing 102, a temperature sensor 14, a movable flange 106, a mounting member 18 and a spring 58. In the following embodiments, like components are indicated by like reference numerals and thus the detailed description thereof is omitted herein for clarity.

The tubular housing 102 defines a first chamber portion 22, a second chamber portion 114 and a third chamber portion 116. Similar to the first embodiment, the mounting member 18 is disposed in the first chamber portion 22 proximate a distal end 111 of the tubular housing 102 and a first seal member 34 in the form of an O-ring is disposed at the end face to seal the interface between the mounting member 18 and the first chamber portion 22.

Unlike the first embodiment, the tubular housing 102 of the present embodiment includes a third chamber portion 116 at the proximal end 124 of the tubular housing 102. The third chamber portion 116 is smaller than the second chamber portion 114 such that a shoulder 120 is defined therebetween. The spring 58 and the movable flange 106 are disposed in the second chamber portion 114. The spring 58 is disposed between the movable flange 106 and the shoulder 120. The movable flange 106 is movable with the temperature sensor 14. A second seal member 118 in the form of an O-ring is disposed in the third chamber portion 118 adjacent to the proximal end 124 of the tubular housing 102 to hermetically seal an interface between the movable temperature sensor 14 and the tubular housing 102. Therefore, any processing gas or pressurized gas from the processing chamber is prevented from traveling beyond the second seal member 118.

Referring to FIG. 7, a sensor assembly 130 according to a third embodiment of the present disclosure is similar to the sensor assembly 100 of the second embodiment except for the second seal member and the portion of the tubular housing 132 proximate the second seal member 136. In the present embodiment, the third chamber portion 116 has an enlarged portion proximate the proximal end 124 of the tubular housing 132 to receive a plastic seal 136. The plastic seal 136, which remains fixed to the proximal end 124 of the tubular housing 132, allows the temperature sensor 14 to be inserted and extended into the processing chamber and retracted into the tubular housing 132 while maintaining a hermetic seal between the movable temperature sensor 14 and the tubular housing 132.

Referring to FIG. 8, a sensor assembly 150 according to a fourth embodiment of the present disclosure is similar to the sensor assembly 130 of the third embodiment except for the second seal member 152 at the proximal end 124 of the tubular housing 156. The second seal member 152 is in the form of a lip seal. In various forms, the first seal member 34 in the form of an O-ring 34 is provided at an end face of the first chamber portion 22 to hermetically seal the interface between the mounting member 18 and the tubular housing 22.

The sensor assembly of the present disclosure can maintain good contact with an object to be measured in a processing chamber while ensuring a hermetic seal between the sensor assembly and the processing chamber. The sensor assembly can be properly biased to ensure contact with the object even after a long period of operation.

While the sensor assembly has been described to include a temperature sensor for measuring a temperature of an object in a processing chamber, any kind of sensor element may replace the temperature sensor to form a similar sensor assembly for measuring other characteristics, such as pressure, flow rate, among others, if a movable sensor element with a hermetic seal is desired.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensor assembly comprising:
   a tubular housing having an inner surface defining an axial chamber, the axial chamber defining a first chamber portion at a distal end and a second chamber portion at a proximal end;
   a temperature sensor disposed in the axial chamber and movable along an axial direction of the tubular housing;
   a mounting member for securing the tubular housing to a processing chamber, the mounting member having a proximal end secured within the first chamber portion of the tubular housing and a distal end protruding from the tubular housing, the distal end of the mounting member configured to be secured to the processing chamber;
   an end seal for hermetically sealing the mounting member against a distal end face of the tubular housing;
   a seal carrier movable with the temperature sensor; and
   a sealing member mounted to the seal carrier,
   wherein the sealing member is in sliding contact with the inner surface of the tubular housing and hermetically seals an interface between the sealing member and the inner surface of the tubular housing.

2. The sensor assembly according to claim 1, wherein the sealing member includes at least one O-ring.

3. The sensor assembly according to claim 2, wherein the seal carrier defines at least one annular groove for receiving the at least one O-ring.

4. The sensor assembly according to claim 1, wherein the seal carrier has a cylindrical shape.

5. The sensor assembly according to claim 1, further comprising a spring disposed in the axial chamber and contacting the seal carrier.

6. The sensor assembly according to claim 5, further comprising an end cap mounted to the tubular housing, the spring being disposed between the end cap and the seal carrier.

7. The sensor assembly according to claim 1, wherein the mounting member includes outer threads engaging inner threads of the tubular housing.

8. The sensor assembly according to claim 1, wherein the end seal is an O-ring.

9. The sensor assembly according to claim 1, further comprising a position indicator secured to the temperature sensor and disposed outside the tubular housing.

10. A sensor assembly comprising:
    a tubular housing;
    a temperature sensor surrounded by the tubular housing and movable along an axial direction of the tubular housing, the tubular housing having an axial chamber defining a first chamber portion at a distal end and a second chamber portion at a proximal end;
    a mounting member for securing the tubular housing to a processing chamber, the mounting member having a proximal end secured within the first chamber portion of the tubular housing and a distal end protruding from the tubular housing, the distal end of the mounting member configured to be secured to the processing chamber;
    an end seal for hermetically sealing the mounting member against an end face of the tubular housing; and
    a movable seal assembly, wherein the movable seal assembly is in sliding contact with an inner surface of the tubular housing and hermetically seals an interface between the movable seal assembly and the inner surface of the tubular housing.

11. The sensor assembly according to claim 10, wherein the movable seal assembly is secured to the temperature sensor.

12. The sensor assembly according to claim 10, wherein the movable seal assembly includes a cylindrical seal carrier secured around the temperature sensor and a sealing member disposed around the cylindrical seal carrier.

13. The sensor assembly according to claim 12, wherein the sealing member includes a pair of O-rings.

14. The sensor assembly according to claim 10, further comprising a compression spring disposed in the tubular housing and contacting the movable seal assembly.

15. The sensor assembly according to claim 14, further comprising an end cap, wherein the compression spring is disposed between the end cap and the moveable seal assembly.

16. A sensor assembly comprising:
a tubular housing having a proximal end and a distal end, the tubular housing having an axial chamber defining a first chamber portion at a distal end and a second chamber portion at a proximal end;
an elongated temperature sensor movable within the tubular housing along an axial direction of the tubular housing, the elongated temperature sensor having a sensor tip protruding from the distal end of the tubular housing;
a mounting member for securing the tubular housing to a processing chamber, the mounting member having a proximal end secured within the first chamber portion of the tubular housing and a distal end protruding from the tubular housing, the distal end of the mounting member configured to be secured to the processing chamber;
an end seal for hermetically sealing the mounting member against an end face of the tubular housing; and
a seal secured to the proximal end of the tubular housing to hermetically seal an interface between the elongated temperature sensor and the tubular housing.

17. The sensor assembly according to claim 16, wherein the seal is selected from a group consisting of an O-ring, a plastic seal, and a lip seal.

18. The sensor assembly according to claim 16, further comprising a movable flange and a spring within the tubular housing.

* * * * *